(12) United States Patent
Meyder et al.

(10) Patent No.: US 7,937,241 B2
(45) Date of Patent: May 3, 2011

(54) METHOD AND DEVICE FOR ANALYZING THE EFFECTS OF THE VIBRATIONS OF A VEHICLE ACTING ON A PERSON

(75) Inventors: Volkhart Meyder, Fürth / Odenwald (DE); Steffen Pankoke, Erlenbach (DE); Dieter Müller, Würzburg (DE)

(73) Assignee: Grammer AG, Amberg (DE)

( * ) Notice: Subject to any disclaimer, the term of this patent is extended or adjusted under 35 U.S.C. 154(b) by 322 days.

(21) Appl. No.: 12/020,412

(22) Filed: Jan. 25, 2008

(65) Prior Publication Data

US 2008/0262785 A1    Oct. 23, 2008

(30) Foreign Application Priority Data

Apr. 23, 2007    (DE) .......................... 10 2007 019 365

(51) Int. Cl.
*G01P 15/00*   (2006.01)
*G06F 19/00*   (2006.01)

(52) U.S. Cl. ...................................... 702/141
(58) Field of Classification Search .................... 702/141
See application file for complete search history.

(56) References Cited

U.S. PATENT DOCUMENTS

| | | | |
|---|---|---|---|
| 5,226,500 A | | 7/1993 | Doi et al. |
| 5,536,059 A | * | 7/1996 | Amirouche ................ 296/65.02 |
| 5,610,686 A | | 3/1997 | Osanai |
| 5,617,315 A | | 4/1997 | Nakao et al. |
| 5,627,440 A | * | 5/1997 | Yamamoto et al. ...... 318/568.21 |
| 5,690,321 A | | 11/1997 | Seni et al. |
| 6,078,791 A | | 6/2000 | Tuttle et al. |
| 6,490,930 B1 | | 12/2002 | Ohkubo et al. |
| 7,487,679 B2 | | 2/2009 | Sirrine et al. |
| 7,578,193 B2 | | 8/2009 | Davidson |
| 2006/0185434 A1 | | 8/2006 | Bernhagen |
| 2007/0236071 A1 | * | 10/2007 | Fujita et al. ................. 297/452.5 |
| 2008/0156602 A1 | * | 7/2008 | Hiemenz et al. ........... 188/267.1 |
| 2008/0258522 A1 | | 10/2008 | Meyder et al. |

FOREIGN PATENT DOCUMENTS

| | | |
|---|---|---|
| DE | 452315 | 11/1927 |
| DE | 19848821 | 5/2000 |
| DE | 102004061574 | 7/2006 |
| DE | 102005043575 | 3/2007 |
| DE | 102005044214 | 3/2007 |
| EP | 1050749 | 11/2000 |
| EP | 1693655 | 8/2006 |
| JP | 2004-058695 | * 2/2004 |
| JP | 2004-185476 | * 7/2004 |
| JP | 2005140668 | 6/2005 |
| WO | 0043952 | 7/2000 |
| WO | 2004057528 | 7/2004 |
| WO | 2005008578 | 1/2005 |
| WO | 2005022690 | 3/2005 |

* cited by examiner

*Primary Examiner* — Cindy Hien-Dieu Khuu
(74) *Attorney, Agent, or Firm* — Black Lowe & Graham, PLLC

(57) ABSTRACT

Methods and systems for analyzing vibrations of a vehicle acting on a person. The person uses a sprung vehicle seat. A detection unit detects acceleration values fitted to the vehicle seat in the x-, y- and z-axes at preset intervals of time. An increase over time of the acceleration values cumulated with one another is determined and a time calculated from this when a pre-determinable permitted maximum of the cumulated acceleration values will foreseeably be reached.

10 Claims, 5 Drawing Sheets

METHOD AND DEVICE FOR ANALYZING THE EFFECTS OF THE VIBRATIONS OF A VEHICLE ACTING ON A PERSON

PRIORITY CLAIM

This application claims priority to German Application No. 102007019365.5 filed Apr. 23, 2007, which application is hereby incorporated by reference in its entirety as if fully set forth herein.

FIELD OF THE INVENTION

The invention relates to a method and device for analyzing the effects of a vehicle vibrating acting on a person.

BACKGROUND OF THE INVENTION

There is a method known for analyzing the effects of a vehicle seat fluctuating on a person, whereby the person is using a vehicle seat in the vehicle, for example from DE 10 2004 061 574 A1. The method described therein uses a sensor to record vibration which is designed as an acceleration sensor and is arranged centrally in a casing. An electronic unit for analyzing the measured signals is integrated in the casing. Analyzing the measured signals from the sensor unit is not described in more detail.

It is known that, under an EU directive, vibrations which act on the driver of a commercial vehicle while using that commercial vehicle during a working day must be recorded, and must not exceed permitted limits. This can generally be done by recording acceleration values emanating from those vibrations, the acceleration values being cumulated, giving a constantly rising acceleration value over a working shift. As the driver was unable before to determine during a working shift whether he could expect to reach the maximum permitted value of the cumulative acceleration values by the end of the shift, the driver could not take appropriate countermeasures ahead of time by taking a break or initiating and implementing another or a different driving pattern.

SUMMARY OF THE INVENTION

The present invention provides a method or device for analyzing the effects of a vehicle vibrating acting on a person, whereby the person is using a sprung, cushioned vehicle seat, which can enable them to alter their driving pattern or driving conditions to avoid reaching a vibration limit prematurely.

One of the main points of the invention is that, in a method for analyzing the effects of a vehicle vibrating acting on a person, whereby the person is using a preferably sprung vehicle seat and acceleration values are detected via a detection unit fitted to the vehicle seat in the x-, y- and z-axes at present intervals of time, an increase over time of the cumulated acceleration values is determined and used as the basis for calculating when a pre-determinable permitted maximum value of the cumulative acceleration values can be expected to be reached. This makes it possible to determine whether a permitted maximum will be reached prematurely, that is, before the end of a working shift of, say, eight hours, based on the vehicle's current vibration pattern. Should it be possible that this will be achieved prematurely on account of the estimated increase, an appropriate warning signal can be displayed or given audibly or shown in its course via a display screen to give the driver the opportunity to change his driving pattern ahead of time, change his route or take a break in good time.

In a preferred embodiment, a residual running time is calculated from the time when the increase is determined to the time when the maximum is expected to be reached. This makes it possible, by comparing the estimated residual running time with the remaining running time of a predetermined minimum time within which the permitted maximum of the cumulated acceleration values will not be reached to be compared and hence determine whether the permitted maximum will not be achieved until after the minimum period of time has elapsed. This can be done, for example, by a suitably designed comparison device which does its work via software design and which is connected to additional memory devices in which the estimated and specified time and acceleration values are saved. Likewise, such a comparison unit can be read out and printed at any time, to enter new values or change the permitted maximum and minimum values, as the case may be.

To determine the increase in the cumulative acceleration values over time, a first cumulative acceleration value at a first point in time and a second, subsequent, acceleration value at a second point in time are calculated and a difference between the second and first acceleration values and a difference between the second and first points in time calculated to determine the rise of a section of curve of the cumulated acceleration values, which are recorded in a diagram over time. This makes it easily possible to determine the foreseeable residual running time until the permitted maximum is reached. Such a calculation may be made either on demand or automatically, preferably repeatedly, such that a forecast based on this as to whether a maximum will be achieved prematurely can be revised or replaced at any time. This gives a constantly updated outcome of the estimated increase values and hence adjusts activating the audible and/or visual warning signal.

Activating such a warning signal can also be done via a number of LEDs or a single diode, in that an LED lights up as soon as there is a risk of reaching the maximum prematurely. Likewise, a selected LED out of a number of LEDs can be tripped in accordance with the gradient of the rise in the curve section, such that the driver can determine quickly and easily from which LEDs are lit how great the risk and approximately how fast this condition will arise, namely reaching the maximum before the end of the working shift which may be eight hours, for example.

Each acceleration value detected is multiplied by a weighting factor as a function of its frequency, giving it a different frequency weighting in its subsequently cumulative calculated state.

Each acceleration value detected can, if necessary, be multiplied by a correction factor to be calculated to correct the acceleration value to assign it to one or more of the x-, y- and z-axes. This is particularly necessary of the device is not arranged on the vehicle seat or the like precisely in the x-, y- and z-axes, so that it must first be corrected and hence the acceleration values running in the x-, y- and z-direction determined.

If a cumulated acceleration value is determined and exceeds the maximum value, a stop display will be made. This can be done by activating a red LED display and/or an audible signal. The driver thus knows that the maximum value which the EU directive permits for vibration patterns has actually been achieved and that he must stop the vehicle and switch off the engine immediately, otherwise he would be in breach of the existing rules on the maximum permitted vibration values in such vehicles, and commercial vehicles particularly.

A device for implementing a method as described above has advantageously at least a casing and an acceleration sensor fitted in it which can record acceleration values in the x-, y- and z-axes, and an associated analysis device which is arranged either directly in the casing or in an internal casing or a PC to which the device casing can be connected. Such device also advantageously has memory devices for saving acceleration values which are measured or specified and a control device for controlling the different components within the device.

BRIEF DESCRIPTION OF THE DRAWINGS

The advantages and suitabilities can be taken from the specification below in conjunction with the drawings, which show as follows.

DETAILED DESCRIPTION OF THE PREFERRED EMBODIMENT

Figure 1:
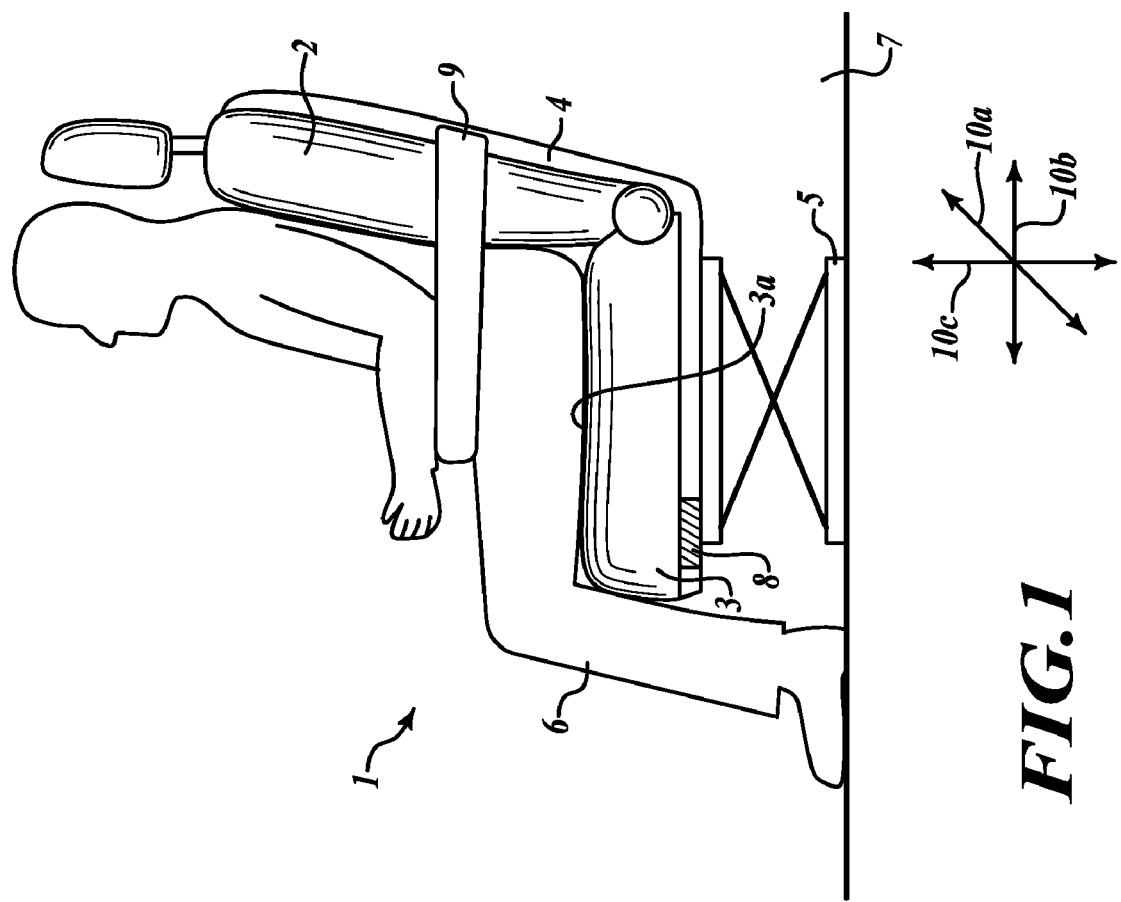
FIG. 1 is a diagrammatic side presentation of a vehicle seat with a device indicated as in the invention and a person sitting on the vehicle seat.

FIG. 1 is a diagrammatic representation of a vehicle seat 1 with a person 6 sitting on it, whereby the vehicle seat 1 has a seat back 2 and a seat cushion 3 with a seat cushion surface 3a on which person 6 is sitting. A vehicle seat frame 4 serves to support the seat back cushion 2 and seat cushion 3.

The vehicle seat frame 4 is sprung-mounted on a preferably sprung vehicle seat base 5. A vehicle floor 7 shown indicatively on which the base 5 is mounted is arranged inside a vehicle which is experiencing vibration from the road on which it is traveling, which is not shown in more detail here.

A device 8 for analyzing and recording such vibrations is mounted on the vehicle seat frame 4, allowing for the vibrations (translation error) deriving from the sprung base 5. An armrest 9 is also mounted on the vehicle seat 1.

Vibrations are measured by an acceleration sensor in the device 8, not shown, in the three main axes, that is, in the x-axis 10a, the y-axis 10b and z-axis 10c.

Figure 2A:
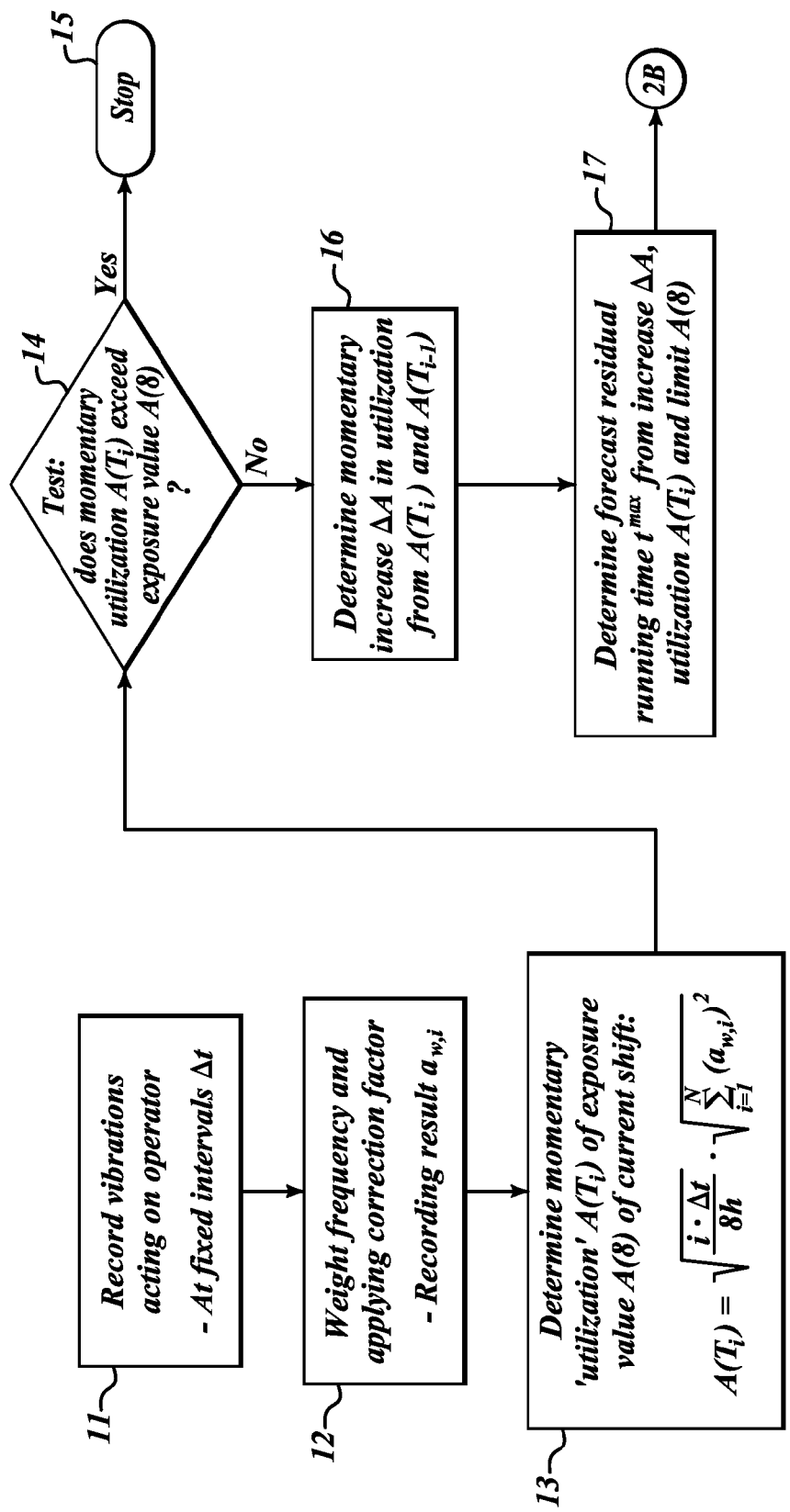
FIGS. 2a, 2b are a working sequence diagram of the method as in the invention in accordance with an embodiment of the invention.
Figure 2B:
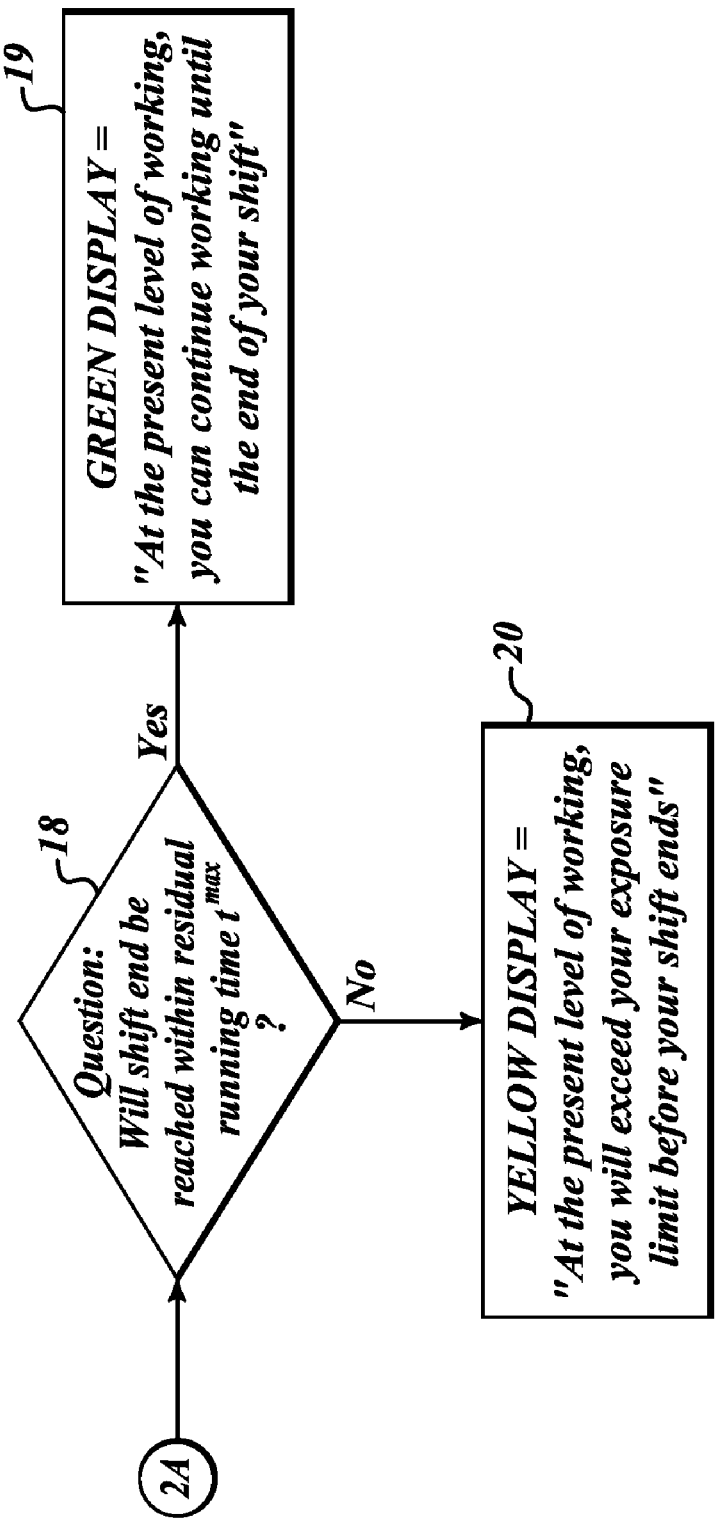

FIGS. 2a and 2b are a working procedural sequence showing an example method of the present invention. From this working procedural diagram, it can be seen that, in a first step 11, the vibrations acting on device 8 and/or the operator are recorded at intervals of time $\Delta t$. Such recordings are therefore made regularly.

Figure 3:
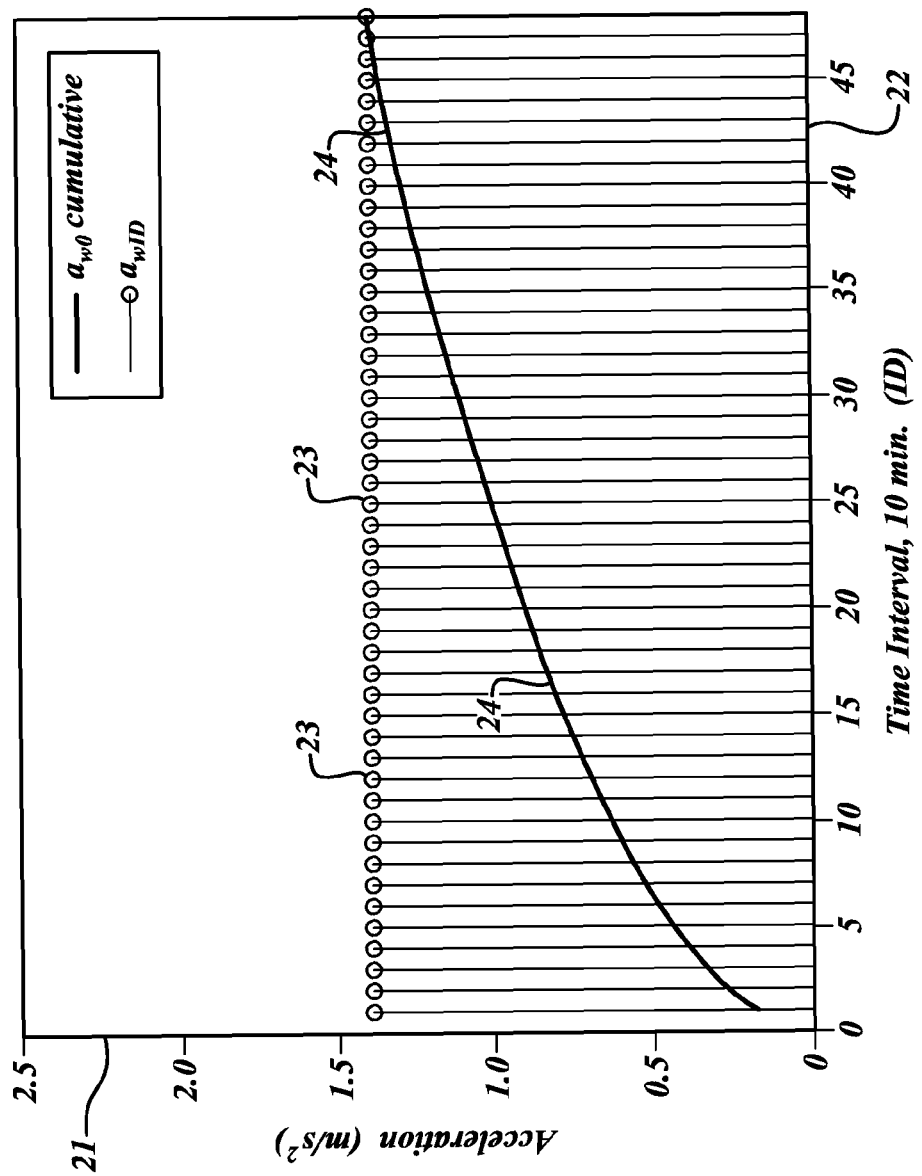
FIG. 3 is a diagram showing measured and cumulated acceleration values as a function of time and at constant working intensity.
Figure 4:
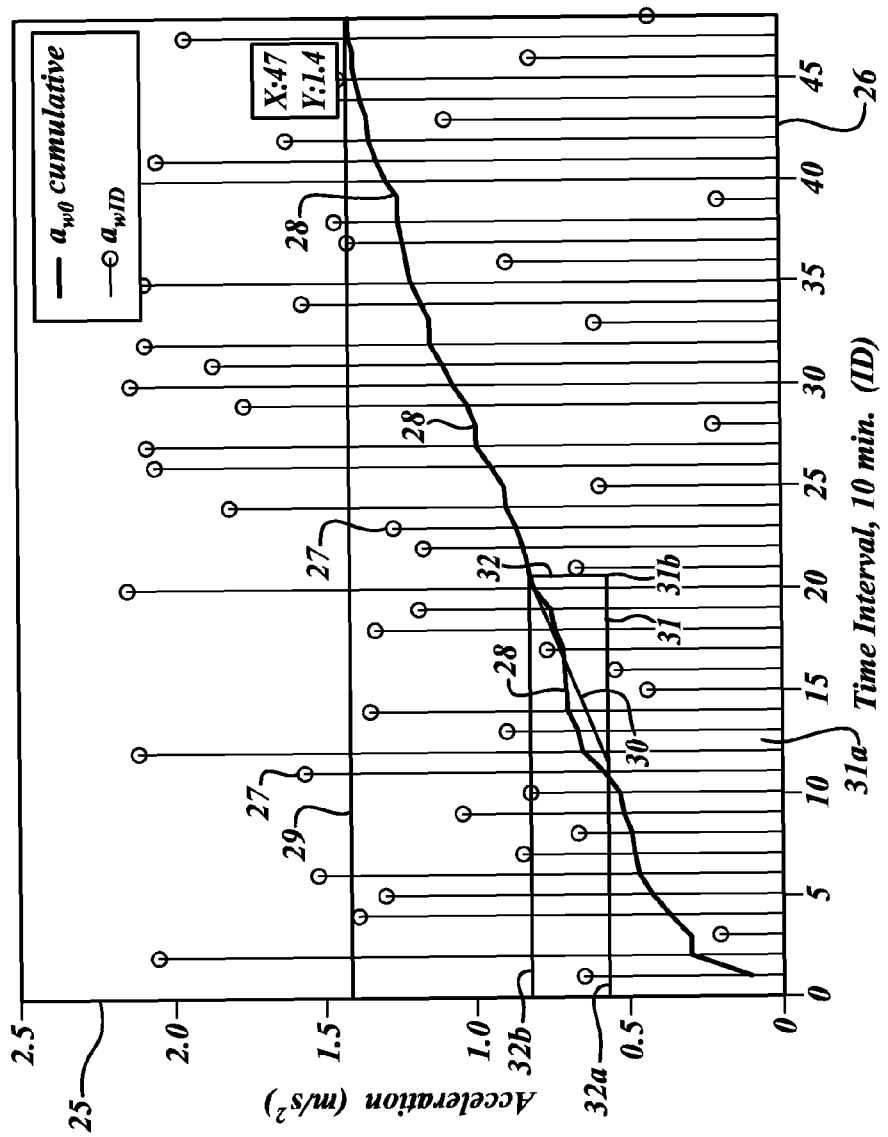
FIG. 4 is a diagram showing measured and cumulated acceleration values as a function of time at a fluctuating working intensity.

In a step 12, a frequency correction is made and a correction factor applied to the vibration values detected or recorded and hence to the acceleration values. The individual acceleration values $a_{WTC}$ as shown in FIGS. 3 and 4 are recorded in chronological sequence.

In a step 13, a so-called momentary utilization $A(T_i)$ of the maximum permitted exposure value $A(8)$ of the current shift is determined using the formula:

$$A(T_i) = \sqrt{\frac{i \cdot \Delta t}{8\,h}} \cdot \sqrt{\sum_{i=1}^{N} (a_{wi})^2}$$

where:

N is the number of acceleration values measured;

$a_{wi}$ are the acceleration values detected;

$\Delta t$ are the intervals of time after which the acceleration value is measured; and 8 h represents a working shift of eight hours.

In a step 14, it is determined whether the momentary utilization $A(T_i)$ exceeds a permitted exposure value of $A(8)$. If this is the case, a stop display is made using indicators 15. If this is not the case, however, step 16 determines the momentary increase $\Delta A$ of the utilization from $A(T_i)$ and $A(T_{i-1})$.

Step 17 then forecasts the residual running time $t^{max}$, representing the maximum residual running time still possible until the permitted maximum exposure value $A(8)$ is reached, determined from the increase in $\Delta A$, utilization $A(T_i)$ and limit $A(8)$.

Step 18 asks whether a shift end will be reached within the estimated residual running time $t^{max}$. If this is so, step 19 illuminates a green display which reads, 'at the present level of working, you can continue working until the end of your shift'.

If the shift will not end within the estimated residual running time $t^{max}$, a yellow display will appear as in step 20, saying that 'at the present level of working, you will exceed your exposure limit before your shift ends'.

FIG. 3 shows a diagram with acceleration values entered on an ordinate 21 and times on abscissa 22. The acceleration values shown in FIG. 3 are measured acceleration values $a_{WTD}$ 23 at a constant level of working which is approx. 1.4 m/s². The resulting acceleration values $a_{w0}$ to be accumulated give a curve 24 as shown in FIG. 3.

FIG. 4 shows the acceleration values $a_{WTD}$ detected at a varying level of working, that is, with differing strengths of vibrations acting via base waves and the like on the commercial vehicle and hence on the person using the driver's seat, see ordinate 25 as a function of time (abscissa 26). The time intervals are 10 min at a time per unit of time shown, giving a total time of eight hours.

The individual acceleration values $a_{WTD}$ detected may be above or below a permitted maximum 29, the decisive factor being that this maximum 29 is not achieved by the cumulated acceleration values $a_{w0}$, reference 28. For this, the individual acceleration values 27 detected are cumulated with one another on an ongoing basis to give an accumulated acceleration value curve 28.

In a curve section, a measurement is carried out to determine the increase in the cumulative acceleration values, represented by a rise section 30 which is averaged. For this, a first cumulative acceleration value 32a is determined at a first point in time 31a. A second acceleration value 32b is determined at a second point in time 31b. Then differences 31 and 32 are calculated from the acceleration values and times to give the rise 30 between the two points in each case. This rise makes it possible to determine whether, if this rise at this slope (30) continues, the permitted maximum 29 will be exceeded ahead of time unintentionally before eight hours have elapsed. This can be displayed and/or indicated audibly via warning signals.

All the characteristics disclosed in the application documents are claimed as essential to the invention insofar as they are new compared with the state of the art, individually or in combination.

KEY TO DRAWINGS

1 Vehicle seat
2 Seat back
3 Seat cushion
3a Seat cushion surface
4 Vehicle seat frame
5 Vehicle seat foot
6 Person
7 Vehicle floor
8 Device
9 Armrest
10a x-axis
10b y-axis
10c z-axis
11-14 Step
15 Stop display
16-20 Step
21 Ordinate
22 Abscissa
23 Acceleration value $a_{WID}$
24 Curve
25 Ordinate
26 Abscissa
27 Detected acceleration values
28 Acceleration values $a_{w0}$
29 Maximum
30 Rise section
31a, b Time
32a First acceleration value
32b Second acceleration value
31, 32 Difference
Δt Time interval
$a_{WID}$ Detected acceleration value
$a_{w0}$ Cumulative acceleration value
$A(T_i), A(T_{i-1})$ Utilization values
A(8) Exposure values
ΔA Momentary increase in utilization While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   at a detection unit fitted to a vehicle seat,
      detecting acceleration values in the x, y, and z-axes at preset intervals of time;
      detecting an increase of cumulated acceleration values over time;
      calculating a time from when a predetermined permitted maximum of the cumulated acceleration values will be reached based on the detected acceleration values and increase of acceleration values,
      wherein detecting increase of the acceleration values cumulated over time includes calculating a first cumulative acceleration value at a first point in time and a second cumulative acceleration value at a second point in time, and calculating the difference between the second and first acceleration values and the difference between second and first points in time of a section of a curve of the cumulative acceleration values entered in a diagram to determine rise over time;
      determining a residual running time from the time when the increase is determined until the time when maximum is expected to be reached; and
      comparing the determined residual running time with remaining time of a preset minimum period of time within which the cumulative acceleration values will not yet reach the permitted maximum.

2. The method of claim 1, further comprising activating a warning display if the residual running time is less than the remaining running time of the minimum period of time.

3. The method of claim 1, further comprising multiplying each detected acceleration value by a weighting factor as a function of its frequency.

4. The method of claim 1, further comprising multiplying each detected acceleration value by a correction factor, the correction factor being calculated to obtain a corrected acceleration value for assigning the acceleration value to one or more of the x, y, and z-axes.

5. The method of claim 1, further comprising activating a stop display if a cumulative acceleration value is determined to exceed the maximum.

6. A system comprising:
   a seat frame configured to support the vehicle seat; and
   a detector attached to the seat frame, the detector configured to detect acceleration values in the x, y, and z-axes at preset intervals of time by a detection unit fitted to the vehicle seat, detect an increase of cumulated acceleration values over time, and calculate a time from when a predetermined permitted maximum of the cumulated acceleration values will be reached based on the detected acceleration values and increase of acceleration values,
   wherein the detector calculates a first cumulative acceleration value at a first point in time and a second cumulative acceleration value at a second point in time, and calculates the difference between the second and first acceleration values and the difference between second and first points in time of a section of a curve of the cumulative acceleration values entered in a diagram to determine rise over time,
   wherein the detector determines a residual running time from the time when the increase is determined until the time when maximum is expected to be reached,
   wherein the detector compares the determined residual running time with remaining time of a preset minimum period of time within which the cumulative acceleration values will not yet reach the permitted maximum.

7. The system of claim 6, further comprising a display, wherein the detector activates a warning on the display if the residual running time is determined less than the remaining running time of the minimum period of time.

8. The system of claim 6, wherein the detector multiplies each detected acceleration value by a weighting factor as a function of its frequency.

9. The system of claim 6, wherein the detector multiplies each detected acceleration value by a correction factor, the correction factor being calculated to obtain a corrected acceleration value for assigning the acceleration value to one or more of the x, y, and z-axes.

10. The system of claim 6, further comprising a display, wherein the detector activates a stop warning on the display if a cumulative acceleration value is determined to exceed the maximum.

* * * * *